United States Patent [19]

Dietz et al.

[11] Patent Number: 4,881,980

[45] Date of Patent: Nov. 21, 1989

[54] PIGMENTS OF THE QUINACRIDONEQUINONE SERIES, PROCESSES FOR THEIR PREPARATION AND THEIR USE

[75] Inventors: Erwin Dietz, Kelkheim; Frank Prokschy, Frankfurt am Main, both of Fed. Rep. of Germany

[73] Assignee: Hoechst Aktiengesellschaft, Frankfurt am Main, Fed. Rep. of Germany

[21] Appl. No.: 71,750

[22] Filed: Jul. 9, 1987

[30] Foreign Application Priority Data

Jul. 11, 1986 [DE] Fed. Rep. of Germany ....... 3623336

[51] Int. Cl.⁴ ..................... C09B 48/00; C09B 67/52
[52] U.S. Cl. .................................. 106/495; 106/497; 546/49; 546/56; 546/57; 546/103
[58] Field of Search .................. 106/288 Q, 309, 495, 106/497; 546/49, 56, 57, 103

[56] References Cited

U.S. PATENT DOCUMENTS

| | | | |
|---|---|---|---|
| 3,287,147 | 11/1966 | Wilkinson | 106/288 Q |
| 3,341,345 | 9/1967 | Ehrich et al. | 106/288 |
| 3,607,336 | 9/1971 | Jaffe | 106/309 |
| 3,686,009 | 8/1972 | West et al. | 106/288 Q |
| 3,748,162 | 7/1973 | West et al. | 106/288 Q |
| 4,258,190 | 3/1981 | Taggi | 546/103 |
| 4,286,998 | 9/1981 | Höltje et al. | 106/288 Q |
| 4,426,231 | 1/1984 | Höltje | 106/288 Q |
| 4,693,753 | 9/1987 | Spietschka et al. | 106/288 Q |

*Primary Examiner*—Paul Lieberman
*Assistant Examiner*—Helene Kirschner

[57] ABSTRACT

Pigments of the quinacridonequinone series consisting of 98–20 mol percent of a quinacridonequinone of the general formula (1)

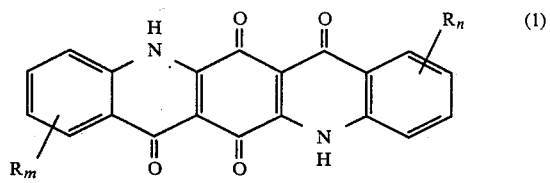

in which R denotes a hydrogen or chlorine atom or a methyl or carbonamide group and m and n are 1 or 2, and 1–65 mol percent of a quinacridone of the general formula (2)

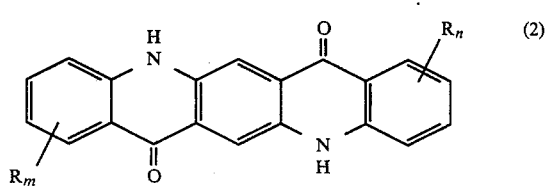

in which R, m and n have the abovementioned meaning, and 1–15 mol percent of one or two acridone derivatives of the general formulae (3) and/or (4)

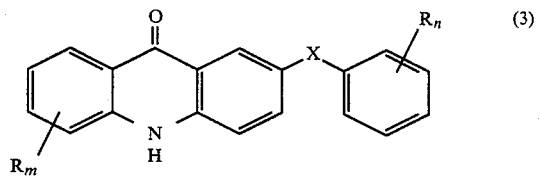

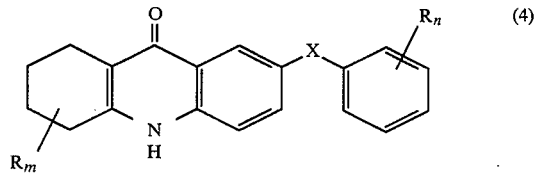

in which X denotes O or NH and R can be identical or different and, like m and n, has the abovementioned meaning, the added compounds of the general formulae (2), (3) and/or (4) being predominantly incorporated into the crystal lattice if the quinacridonequinone of the general formula (1), processes for their preparation and their use for coloring synthetic and naturally occurring materials.

12 Claims, No Drawings

PIGMENTS OF THE QUINACRIDONEQUINONE SERIES, PROCESSES FOR THEIR PREPARATION AND THEIR USE

The invention relates to novel gold- and maroon-colored pigments of the quinacridonequinone series which have very good light- and weathering-fastness properties, processes for their preparation and their use for coloring synthetic and naturally occurring materials, in particular for the preparation of high quality lacquers for metallic car lacquerings.

The quinacridonequinones of the following formula CC which form the essential constituent of these pigments have already been known for a relatively long time (Sharvin, J. Russ. Phys. Chem. Ges. 47, 1260 (1915); Lesnianski, Ber. 51, 695 (1918)). Although they have an interesting yellow color shade and are insoluble in most solvents, they have not been used as pigments because of their lack of fastness to light and weathering.

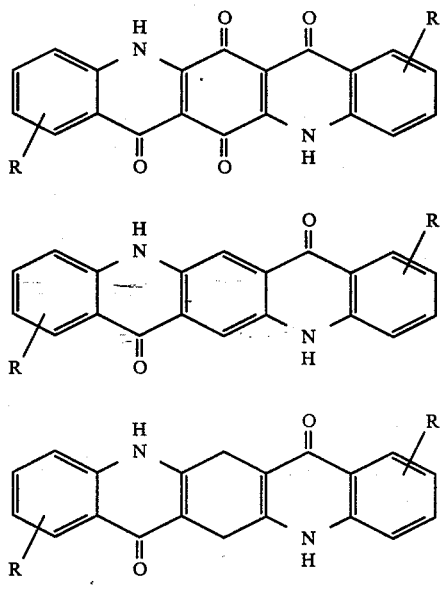

This deficiency of quinacridonequinones (formula CC) has been eliminated by mixed crystal formation with quinacridones (formula C) and dihydroquinacridones (formula DC) (U.S. Pat. No. 3,686,009 and U.S. Pat. No. 3,748,162).

This deficiency was also eliminated by addition of simpler compounds, such as, for example, derivatives of N,N'-diphenyl-p-phenylenediamine (formula P, U.S. Pat. No. 3,341,345) or 2-anilinoacridone (formula A, U.S. Pat. No. 4,286,998) with mixed crystal formation.

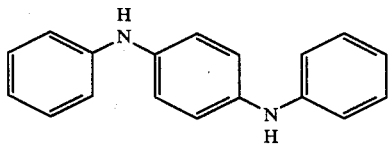

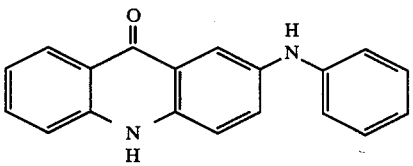

By a mixed crystal or a solid solution, it is understood here that one or more added compounds are present in the crystal lattice of a "host compound". The X-ray diffraction diagram of a mixed crystal then shows only (in many cases extended) crystal lattice of this "host compound", whereas all the components are detectable in the diagram of the corresponding mechanical mixture.

Compounds which are derived from 2-anilinoacridone (formula A) are highly suitable for incorporation into the crystal lattice of quinacridonequinones (formula CC) from the point of view of their structure. On combining quinacridonequinone and 2-anilinoacridone, however, a sufficient improvement in the fastness of the resulting mixed crystal pigment to light and weathering is only achieved at relatively large amounts of this additive (10–15% by weight), or basic nickel carbonate must additionally also be applied to the surface of the pigment (U.S. Pat. No. 4,286,998). The addition of relatively large amounts of 2-anilinoacridone considerably reduces the tinctorial strength in comparison with quinacridonequinones, since the derivatives of 2-anilinoacridone (formula A) are colorless to pale yellow-colored compounds. The round-about route with nickel-containing substances (such as, for example, nickel oxides and carbonates) is not acceptable for toxicological reasons.

Mixed crystals of quinacridonequinones and quinacridone (formula CC and C where R=H) have a better fastness to light and weathering the morequinacridone there is incorporated into the crystal lattice of the quinacridonequinone. Nevertheless, this effect is observed only up to a molar ratio of quinacridonequinone:quinacridone of about 1:1. If the amounts of quinacridone are increased beyond this ratio, this compound is no longer incorporated into the crystal lattice of the quinacridonequinone. This excess quinacridone can be detected in the X-ray diffraction diagram alongside the shifted reflexes of the quinacridonequinone lattice. Although these pigments have a considerably better fastness to light and weathering than the pure quinacridonequinones, this improvement is still not sufficient for use in practice.

It has now been found that by incorporation of quinacridones and a 2-anilino- or 2-phenoxy-acridone derivative into the crystal lattice of quinacridonequinones, gold- and maroon-colored pigments, depending on what amounts of quinacridones are present, with very good fastness to light and weathering are obtained.

The present invention thus relates to novel pigments of the quinacridonequinone series consisting of 98-20 mol percent of a quinacridonequinone of the general formula (1)

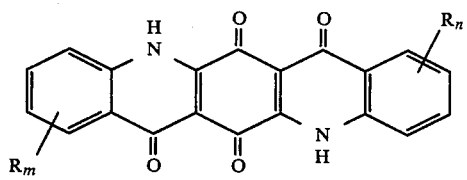

in which R denotes a hydrogen or chlorine atom or a methyl or carboxamide group and m and n are 1 or 2, and 1-65 mol percent of a quinacridone of the general formula (2)

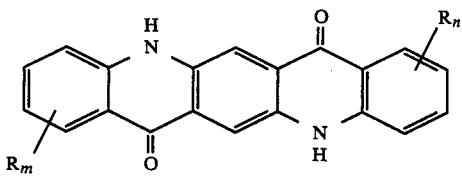

in which R, m and n have the abovementioned meaning, and 1-15 mol percent of one or two acridone derivatives of the general formulae (3) and/or (4)

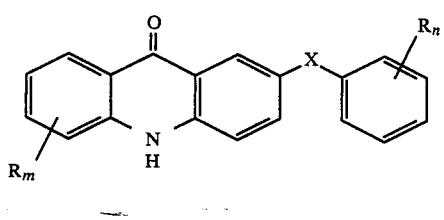

- and/or

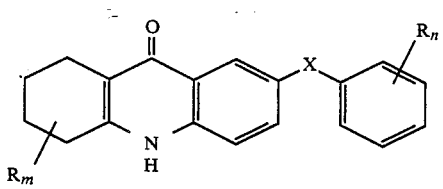

in which X denotes O or NH and the symbols R can be identical or different and, like m and n, have the abovementioned meaning, the added compounds of the general formulae (2), (3) and/or (4) being predominantly incorporated into the crystal lattice of the quinacridonequinone of the general formula (1).

Particularly useful novel pigments of the quinacridonequinone series are those which consist of 98-70 mol percent of the quinacridonequinone of the formula

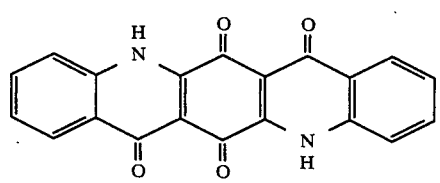

1-15 mol percent of the quinacridone of the formula and 1-15 mol percent of one or two acridone derivatives of the formulae

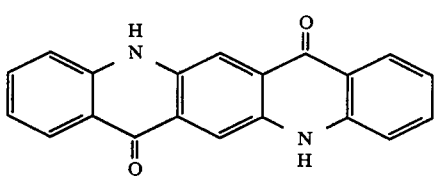

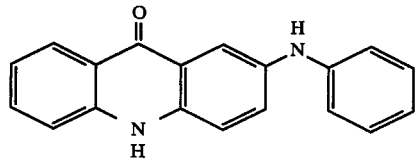

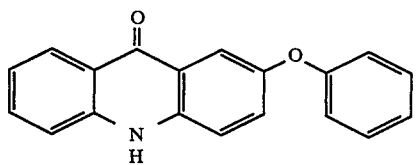

the added compounds being present in the crystal lattice of the quinacridonequinone, and those which consist of 54-20 mol percent of the quinacridonequinone of the formula

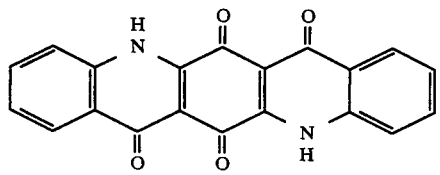

45-65 mol percent of the quinacridone of the formula

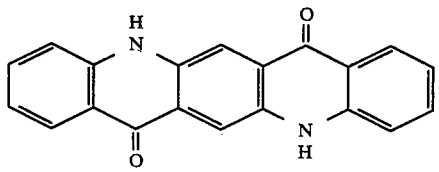

and 1-15 mol percent of one or two acridone derivatives of the formulae

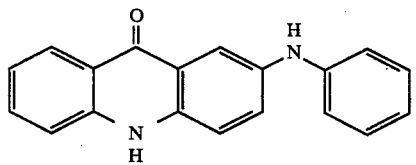

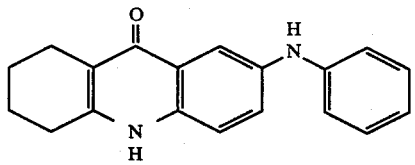

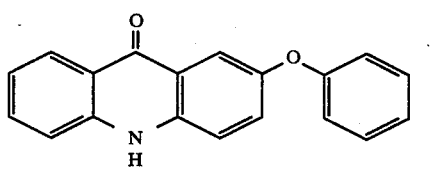

the added compounds predominantly being in the crystal lattice of the quinacridonequinone.

The invention furthermore relates to a process for the preparation of the novel mixed crystal pigments mentioned, by dissolving the compounds of the general formulae (1), (2), (3) and/or (4) mentioned in 5 to 40 times the amount by weight of an acid which, at the particular temperatures used, is inert towards the abovementioned compounds to be dissolved, and then hydrolyzing the compounds by pouring the solution into 5 to 20 times the amount by weight of water at 0°–50° C., based on the weight of acid employed (100% strength). 96–100% strength sulfuric acid (temperature 0°–30° C.) and polyphosphoric acid (temperature 120°–160° C.) are particularly suitable for dissolving the compounds mentioned.

Finally, the invention relates to a process for the preparation of the mixed crystal pigments mentioned by cyclizing the precursors of the general formulae (1), (2) and (3), that is to say compounds of the general formulae (1a), (2a) and (3a)

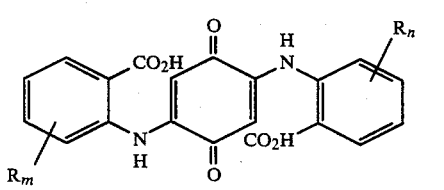

(1a)

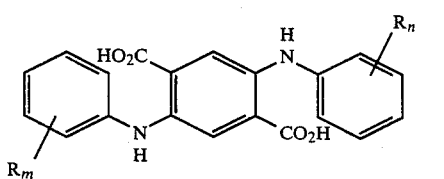

(2a)

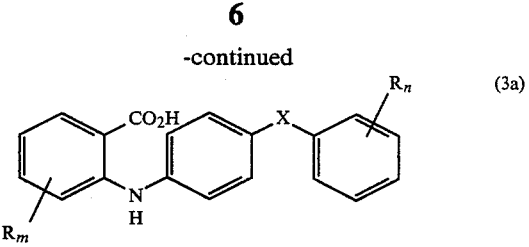

(3a)

in which R, m, n and X have the abovementioned meanings, together in a dehydrating medium, such as, for example, in 8 to 40 times the amount by weight of polyphosphonic acid at 100°–180° C., and subsequently hydrolyzing the products as described above.

The mixed crystal pigments according to the invention are suitable for coloring synthetic and naturally occurring materials, but in particular for the production of gold- and maroon-colored metallic car lacquerings.

The acridone derivatives of the general formula (3) can be synthesized by reaction of correspondingly substituted 2-chlorobenzoic acids with correspondingly substituted 4-aminodiphenylamine or 4-aminodiphenyl ether derivatives and subsequent cyclization of the products in sulfuric or polyphosphoric acid (Kalb, Ber. d. dt. chem. Ges. 43, 2209 (1919)).

Acridone derivatives of the general formula (3) are furthermore obtainable by catalytic dehydrogenation of the corresponding tetrahydro compounds (general formula (4)), which can be obtained by reaction of correspondingly substituted cyclohexanone-2-carboxylic acid esters with correspondingly substituted 4-aminodiphenyl ether derivatives and cyclization of the products in a high-boiling organic solvent (U.S. Pat. No. 4,286,998). Another possibility of preparing the acridone derivatives in question is described in German Offenlegungsschrift No. 2,165,647. The weathering tests were carried out with a Xenotest X 1200 W apparatus from ORIGINAL HANAU HERAEUS GMBH in a TSA lacquer system (1:1 $TiO_2$ brightening).

$\Delta E$ is a measure of the fastness of a pigment to light and weathering and indicates the difference between the color sites on the weathered and non-weathered sample (DIN 6174). The smaller this value is after a certain period of time, the better the fastness of the pigment in question to light and weathering.

When tested by this method, useful pigments have a $\Delta E$ value of less than 3 after weathering for 2,000 hours; if this value is exceeded at an earlier point in time, the weathering process is interrupted. The $\Delta E$ values are as a rule compared after the same duration of weathering.

The amounts stated in the following examples are amounts by weight.

EXAMPLE

A parts of quinacridonequinone, B parts of quinacridone and C parts of 2-anilino-acridone are dissolved in X parts of 98% strength sulfuric acid at a maximum of 30° C.; the resulting solution is then hydrolyzed by pouring into Y parts of water at 0° C. and the resulting suspension is heated at 90° C. for 2 hours. After filtration with suction, washing until neutral and drying, Z parts of a gold-colored pigment are obtained (in this context, cf. the following table).

| Example | A | B | C | X | Y | Z | Molar ratio A:B:C | ΔE 1000 h | ΔE 2000 h |
|---|---|---|---|---|---|---|---|---|---|
| 1a | 13.7 | 1.6 | 1.4 | 140 | 1400 | 16.1 | 8:1:1 | 0.9 | 1.0 |
| 1b | 27.4 | 3.2 | — | 240 | 2200 | 29.7 | 8:1:— | 2.2 | 3.1 |
| 1c | 11.3 | — | 2.0 | 110 | 1200 | 12.9 | 4.7:—:1 | 3.0 | — |
| 1d | 11.3 | — | 2.0 | 110 | 1200 | 13.3 | 4.7:—:1 | 1.3 | 2.4* |

*According to Example 3 fom U.S. Pat. No. 4,286,998, but the addition of surface-active substances (apart from the nickel salt) was dispensed with.

The pigments obtained by Comparison Examples 1b–1d are clearly inferior to the patent according to the invention (Example 1a) in respect of fastness to light and weathering.

EXAMPLE 2

The procedure is as described in Example 1, but with the difference that instead of C parts of 2-anilinoacridone, D parts of 1,2,3,4-tetrahydro-8-anilinoacridone are used (in this context, cf. the following table).

| Example | A | B | D | X | Y | Z | Molar ratio A:B:D | ΔE 1000 h | ΔE 1500 h |
|---|---|---|---|---|---|---|---|---|---|
| 2a | 13.7 | 1.56 | 1.44 | 160 | 1400 | 16.1 | 8:1:1 | 0.9 | 1.1 |
| 2b | 15.1 | — | 1.6 | 160 | 1400 | 16.0 | 8:—:1 | 3.9 | — |

The pigment from Example 2a is clearly superior to that from Example 2b in its fastness to light and weathering.

EXAMPLE 3

13.7 parts of quinacridonequinone, 0.78 part of quinacridone, 0.62 part of 2-anilinoacridone and 0.09 part of 1,2,3,4-tetrahydro-8-anilino-acridone are dissolved in 160 parts of 98% strength sulfuric acid and hydrolyzed by pouring into 1,000 parts of water at 0° C., and the product is further treated as described in Example 1. 14.6 parts of a gold-colored pigment which has a ΔE value of 1.0 after weathering for 1,000 hours in the TSA lacquer system described above (1:1 $TiO_2$ brightening) are obtained.

EXAMPLE 4

A parts of 2,9-dimethylquinacridonequinone, B parts of 2,9-dimethylquinacridone and C parts of 2-anilinoacridone are dissolved in 200 parts of 98% strength sulfuric acid at 20° C. and hydrolyzed by pouring into 1,200 parts of water at 0° C., and the product is further treated as described in Example 1. Z parts of a gold-colored pigment are obtained.

| Example | A | B | C | Z | Molar ratio A:B:C | ΔE 500 h |
|---|---|---|---|---|---|---|
| 4a | 12.95 | 1.49 | 1.25 | 15.1 | 8:1:1 | 1.6 |
| 4b | 14.8 | — | 1.27 | 15.5 | 9:—:1 | 2.7 |
| 4c | 14.8 | 1.5 | — | 15.7 | 9:1:— | 4.5 |

EXAMPLE 5

A parts of quinacridonequinone and B parts of quinacridone are dissolved in 180 parts of 98% strength sulfuric acid. C parts of 2-phenoxyacridone and D parts of 1,2,3,4-tetrahydro-8-phenoxyacridone are then added at a maximum of 10° C. and the mixture is stirred at 10° C. for 5–10 minutes. The sulfuric acid solution is hydrolyzed by pouring into 1,100 parts of water at 0° C. and working up is carried out as described in Example 1. Z parts of a gold-colored pigment are obtained.

| Example | A | B | C | D | Z | Molar ratio A:B:C:D | ΔE 1000 h |
|---|---|---|---|---|---|---|---|
| 5a | 13.7 | — | 1.45 | — | 14.6 | 8:—:1:— | 3.2 |
| 5b | 13.7 | 1.56 | 1.45 | — | 15.9 | 8:1:1:— | 1.9 |
| 5c | 13.7 | 1.56 | 0.65 | — | 15.3 | 8:1:0.45:— | 2.0 |
| 5d | 13.7 | — | — | 1.45 | 14.8 | 8:—:—:1 | 2.8 |
| 5e | 13.7 | 1.56 | — | 1.45 | 16.2 | 8:1:—:1 | 1.5 |

EXAMPLE 6

13.7 parts of quinacridonequinone, 2.0 parts of 2,9-dicarboxamidoquinacridone and 0.72 part of 2-anilinoacridone are dissolved in 160 parts of 98% strength sulfuric acid at 15° C. and the resulting solution is then hydrolyzed by pouring into 1,000 parts of water at 0° C. After working up as described in Example 1, 15.7 parts of a gold-colored pigment with good fastness to light and weathering, the X-ray diffraction diagram of which shows only the reflexes of the quinacridonequinone, are obtained.

EXAMPLE 7

13.7 parts of quinacridonequinone, 1.56 parts of quinacridone and 1.43 parts of 2-anilinoacridone are dissolved in 350 parts of polyphosphoric acid (84% strength $P_4O_{10}$) at 130°–140° C. and the solution is stirred at this temperature for 1–2 hours. After hydrolysis by pouring into 2,500 parts of ice-water and working up as described in Example 1, 15.9 parts of a gold-colored pigment, the X-ray diffraction diagram of which shows only the reflexes of the quinacridonequinone, are obtained.

EXAMPLE 8

A parts of quinacridonequinone, B parts of quinacridone and C parts of 8-methyl-2-(4-toluylamino)-acridone are dissolved in 180 parts of 98% strength sulfuric acid at 15° C. The solution is then hydrolyzed by pouring into 1,080 parts of ice-water. Working up as described in Example 1 gives Z parts of a gold-colored pigment (in this context, cf. the following table), the product according to Example 8b being superior to that according to 8a in respect of fastness to light and weathering.

| Example | A | B | C | Z | Molar ratio A:B:C |
|---|---|---|---|---|---|
| 8a | 15.4 | — | 1.57 | 16.2 | 90:—:10 |
| 8b | 15.4 | 0.78 | 0.79 | 16.2 | 90:5:5 |

EXAMPLE 9

22.7 parts of 2,5-bis-(2-carboxy-anilino)-1,4-benzoquinone (formula 1a, R=H) are introduced into 600 parts of polyphosphoric acid (84% strength $P_4O_{10}$) at 130°–140° C. in the course of 45 minutes. 2.6 parts of 2,5-dianilinoterephthalic acid (formula 2a, R=H) and 1.8 parts of 4-(2-carboxyanilino)-diphenylamine (formula 3a, R=H, X=NH) are then added. Thereafter, the batch is stirred at 140°–150° C. for 2 hours. Hydrolysis is carried out by pouring this solution into 4,800 parts of water at 50° C., and working up is carried out as described in Example 1. 22.5 parts of a gold-colored pigment, the X-ray diffraction diagram of which shows only the reflexes of the quinacridonequinone, are obtained.

EXAMPLE 10

The procedure is as described in Example 9, except that instead of 1.8 parts of 4-(2-carboxyanilino)-diphenylamine, 1.8 parts of 4-(2-carboxyanilino)-diphenyl ether (formula 3a, R=H, X=O) are added. 21.6 parts of a gold-colored pigment are obtained.

EXAMPLE 11

6.8 parts of quinacridonequinone, 9.4 parts of quinacridone and 1.44 parts of 1,2,3,4-tetrahydro-8-anilinoacridone are dissolved in 160 parts of 98% strength sulfuric acid at 20°–15° C. The resulting solution is then hydrolyzed by pouring into 1,400 parts of water at 0° C. and the resulting suspension is heated at 90° C. for 2 hours. After filtration with suction, washing until neutral and drying, 17.0 parts of a maroon-colored pigment which, after weathering for 1,500 hours in the TSA lacquer system described above (1:1 $TiO_2$ brightening), has a ΔE value of 1.0 are obtained.

EXAMPLE 12

5.1 parts of quinacridonequinone, 9.4 parts of quinacridone and 1.44 parts of 2-anilinoacridone are treated as described in Example 11. 15.3 parts of a maroon-colored pigment which, after weathering for 2,000 hours in the TSA lacquer system described above (1:1 $TiO_2$ brightening), has a ΔE value of 1.5 are obtained.

EXAMPLE 13

A parts of quinacridonequinone, B parts of quinacridone and C parts of 2-phenoxyacridone are dissolved in X parts of 98% strength sulfuric acid at 10°–15° C. The resulting solution is then hydrolyzed by pouring into Y parts of water at 0° C. After working up according to Example 11, Z parts of a maroon-colored pigment (cf. the following table) are obtained.

| Example | A | B | C | X | Y | Z | ΔE 1000 h | ΔE 2000 h |
|---|---|---|---|---|---|---|---|---|
| 13a | 5.1 | 9.4 | 1.44 | 140 | 1400 | 15.4 | 1.4 | 2.0 |
| 13b | 7.7 | 7.02 | 1.45 | 180 | 900 | 15.6 | 0.4 | 0.9 |
| 13c | 7.7 | 7.02 | 0.65 | 180 | 900 | 14.6 | 0.9 | 1.1 |

EXAMPLE 14

17.0 parts of 2,5-bis-(2-carboxy-anilino)-1,4-benzoquinone (formula 1a, R=H) are introduced into 560 parts of polyphosphoric acid (84% strength $P_4O_{10}$) at 130°–140° C. in the course of 45 minutes. 15.7 parts of 2,5-dianilinoterephthalic acid (formula 2a, R=H) and 3.1 parts of 4-(2-carboxy-anilino)-diphenylamine (formula 3a, R=H, X=NH) are then added and the batch is stirred at 140°–150° C. for 2 hours. Hydrolysis is carried out by pouring this solution into 3,400 parts of water at 50° C. and further working up is carried out as described in Example 11. 29.7 parts of a maroon-colored pigment are obtained.

In the X-ray diffraction diagram, the pigments obtained according to Examples 11–14 also show, in addition to the shifted crystal lattice of the quinacridonequinone, small reflexes of quinacridone.

We claim:

1. A substantially nickel free pigment of the quinacridonequinone series consisting essentially of 98-20 mol percent of a quinacridonequinone of the formula (1)

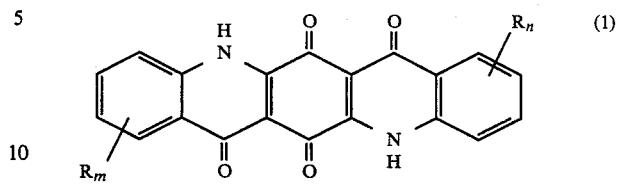

in which R denotes a hydrogen or chlorine atom or a methyl or carboxamide group and m and n are 1 or 2, and 1–65 mol percent of a quinacridone of the formula (2)

in which R, m and n have the abovementioned meaning, and 1–15 mol percent of one or two acridone derivatives of the formulae (3) and/or (4)

in which X denotes O or NH and the symbols R can be identical or different and, like m and n, have the abovementioned meaning, the added compounds of the formulae (2), (3) and/or (4) being predominantly incorporated into the crystal lattice of the quinacridonequinone of the formula (1).

2. A pigment of the quinacridonequinone series consisting of 98–70 mol percent of the quinacridonequinone of the formula 1–15 mol percent of the quinacridone of the formula

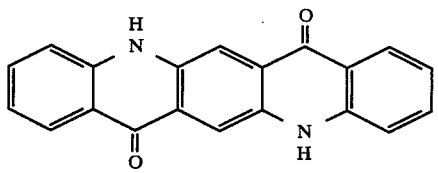

and 1-15 mol percent of one or two acridone derivatives of the formulae

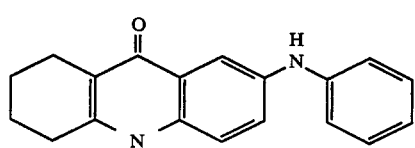

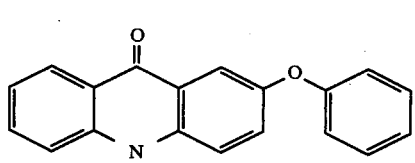

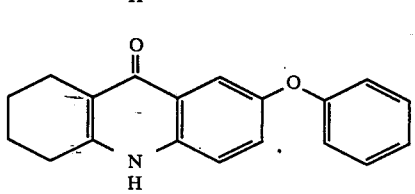

the added compounds being present in the crystal lattice of the quinacridonequinone.

3. A pigment of the quinacridonequinone series consisting of 54-20 mol percent of quinacridonequinone of the formula

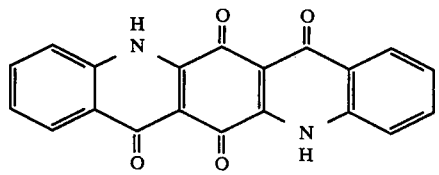

45-65 mol percent of the quinacridone of the formula

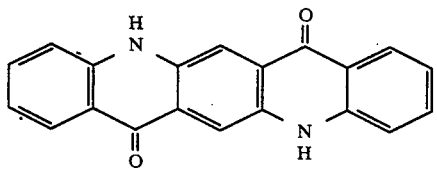

and 1-15 mol percent of one or two acridone derivatives of the formulae

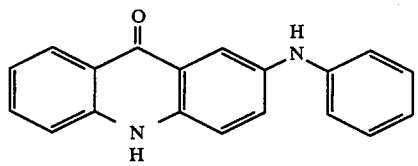

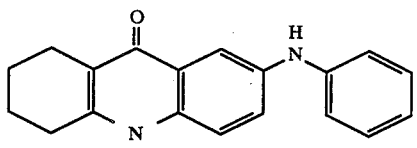

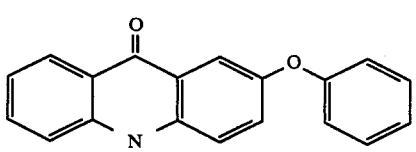

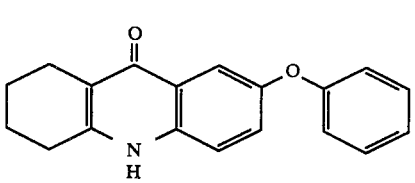

the added compounds predominantly being in the crystal lattice of the quinacridonequinone.

4. A process for the preparation of a mixed crystal pigment as claimed in claim 1, which comprises dissolving the compounds of the formulae (1), (2), (3) and/or (4) mentioned there in 5 to 40 times the amount by weight of an acid which, at the particular temperatures used, is inert towards the abovementioned compounds to be dissolved, and then hydrolyzing the compounds by pouring the solution into 5 to 20 times the amount by weight of water at 0°-50° C., based on the weight of acid employed (100% strength).

5. The process as claimed in claim 4, wherein the compounds of the formulae (1), (2), (3) and/or (4) are dissolved in 5 to 20 times the amount by weight of 96-100% strength sulfuric acid at 0°-30° C.

6. The process as claimed in claim 4, wherein the compounds of the formulae (1), (2), (3) and/or (4) are dissolved in 10 to 40 times the amount by weight of polyphosphoric acid (80-86% strength $P_4O_{10}$) at 120°-160° C.

7. A process for the coloring of synthetic and native materials wherein a mixed crystal pigment as claimed in claim 1 is applied.

8. A process for the production of metallic car lacquerings wherein a mixed crystal pigment as claimed in claim 1 is applied.

9. A pigment of the quinacridonequinone series as claimed in claim 1, in which said X term of formulae (3) and (4) denotes NH.

10. A process for the preparation of a mixed crystal pigment which comprises:
cyclizing 98-25 mol percent of a compound of the formula (1a), 1-60 mol percent of a compound of the formula (2a) and 1-15 mol percent of a compound of the formula (3a)

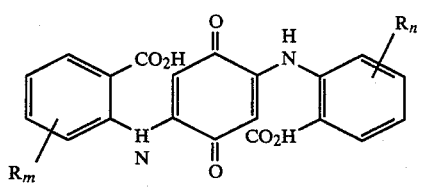

(1a)

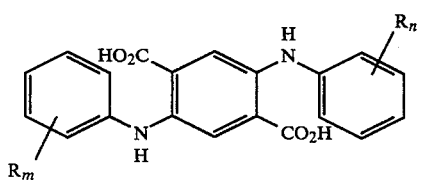

(2a)

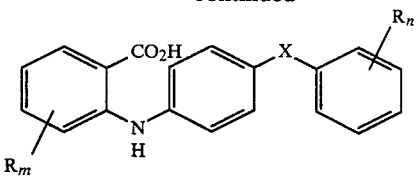

(3a)

in which
R denotes a hydrogen or chlorine atom or a methyl or carboxamide group, and the R substituents can be the same or different,
m and n are 1 or 2, and
X denotes O or NH, together in 8 to 40 times the amount by weight of polyphosphoric acid at temperatures of 100°–180° C. and then hydrolyzing the product by pouring the solution into 5 to 20 times the amount by weight of water at 0°–50° C., based on the weight of the polyphosphoric acid employed.

11. A process as claimed in claim 10 wherein the polyphosphoric acid is 80–86% strength $P_4O_{10}$.

12. A process as claimed in claim 10, in which X is NH.

* * * * *